A. HEAPS.
Rub-Rolls for Condenser Cards.

No. 149,124. Patented March 31, 1874.

Witnesses:
Chas. Nida
Sidgwick

Inventor:
A. Heaps
Per _____
Attorneys.

UNITED STATES PATENT OFFICE.

ALONZO HEAPS, OF DARBY, PENNSYLVANIA, ASSIGNOR TO HIMSELF AND ENOS VERLENDEN, OF SAME PLACE.

IMPROVEMENT IN RUB-ROLLS FOR CONDENSER-CARDS.

Specification forming part of Letters Patent No. 149,124, dated March 31, 1874; application filed September 27, 1873.

*To all whom it may concern:*

Be it known that I, ALONZO HEAPS, of Darby, in the county of Delaware and State of Pennsylvania, have invented a new and useful Improvement in Finisher-Rubbers for Carding-Machines, of which the following is a specification:

My invention consists of a tube having the feather or spline formed on it, and so constructed that it fits on the spindle of the rub-roller nicely, and is secured by a nut or other means, so that it can be readily taken off and another put on, so that a new feather can be put on when the old one is worn out without disturbing the spindle, which, as heretofore arranged, had to be taken off from the roller to be repaired.

Figure 1:
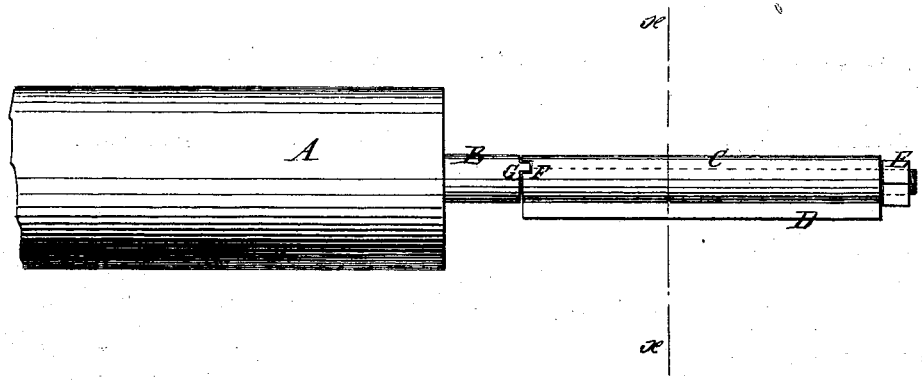
Figure 2:
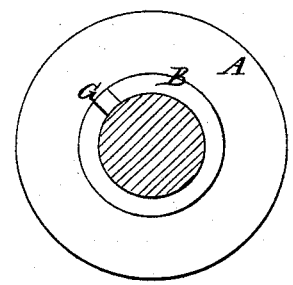
Figure 3:
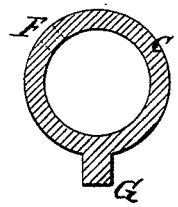

Figure 1 is a side elevation of a rub-roller and spindle arranged according to my invention. Fig. 2 is a cross-section of the spindle on the line $x\ x$, and Fig. 3 is a cross-section of the tube on the same line.

A is the rub-roll; B, the spindle; C, the tube; D, the feather; and E, the nut, by which the feather is fastened on the spindle. From a point a little distance from the end of the rubber I make the spindle as much smaller than the other portion as is needful for fitting on the tube, which is the same size as the unreduced portion of the spindle. Said tube has the feather D so formed in it that the latter may be removable when worn by simply taking off one tube and putting on another. The inner end of the tube has a notch, F, and the spindle has a stud, G, engaging said notch so that the rubber and the tube will be turned together.

The tube is held up to the stud and on the spindle by the nut, which may also be pinned if needed.

Time and labor are, by my invention, saved, since, in some cases at present, the rubber must be taken to a shop, the spindle detached, the old feather removed, the latter renewed, and the spindle returned to the rubber. In other cases the entire journal of the roll must be removed and replaced.

Having thus described my invention, I claim as new and desire to secure by Letters Patent—

The feather D, of the spindle of a rub-roll, applied detachably to said spindle by a tube, C, substantially as described.

ALONZO HEAPS.

Witnesses:
GEO. S. PATCHEL,
ENOS VERLENDEN.